Sept. 11, 1934.  J. A. SHAFER  1,973,664
CAR TRUCK
Filed June 6, 1930  5 Sheets-Sheet 1

Inventor
James A. Shafer
By his Attorney
Clarence D. Kerr

Sept. 11, 1934.   J. A. SHAFER   1,973,664
CAR TRUCK
Filed June 6, 1930   5 Sheets-Sheet 3

Inventor
James A. Shafer
By his Attorney
Clarence D. Kerr

Sept. 11, 1934.  J. A. SHAFER  1,973,664
CAR TRUCK
Filed June 6, 1930  5 Sheets-Sheet 4

Inventor:
James A. Shafer
By his Attorney
Clarence Kerr

Sept. 11, 1934.　　　　　J. A. SHAFER　　　　　1,973,664
CAR TRUCK
Filed June 6, 1930　　　5 Sheets-Sheet 5

Inventor:
James A. Shafer
By his Attorney
Clarence D. Kerr

Patented Sept. 11, 1934

1,973,664

UNITED STATES PATENT OFFICE 1,973,664

CAR TRUCK

James A. Shafer, East Cleveland, Ohio, assignor to National Malleable & Steel Castings Company, Cleveland, Ohio, a corporation of Ohio Application June 6, 1930, Serial No. 459,480

48 Claims. (Cl. 105—197)

This invention relates to car trucks. In my copending application, Serial No. 347,262, filed March 15, 1929, I have shown an improved car truck of increased spring capacity wherein the customary spring plank may be omitted and having various other advantages. One of the objects of the present invention is the provision of a car truck wherein the spring plank may be omitted and wherein additional strength of the side frames may be obtained, particularly in the tension portions thereof. The invention further comprises a side frame in which the bending moment on the tension portion is considerably decreased and the frame as a whole thereby further strengthened. In addition, I have provided a side frame having columns of increased strength. My improved car truck may, moreover, be assembled and disassembled with facility. In carrying out the invention I have further devised a novel and improved arrangement of bolster-supporting springs, certain of which springs are positioned above others thereof, and in overlapping relation thereto. Also, the invention provides a construction wherein the length of the truck may be decreased below the length now employed. Other features of the invention will be hereinafter described and claimed.

Figure 1:
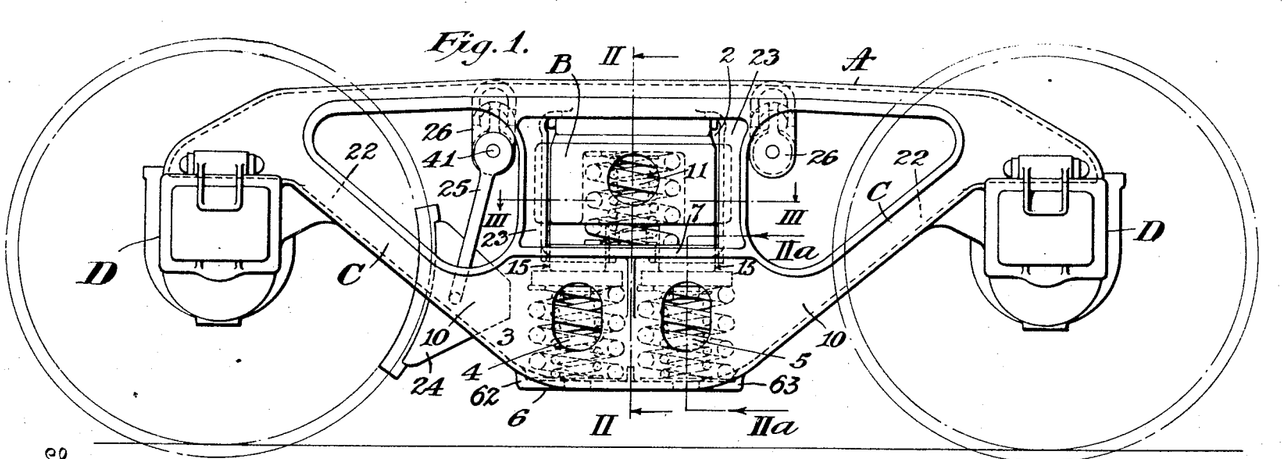
Fig. 1 is a side elevation of a car truck embodying my invention.
Figure 2:
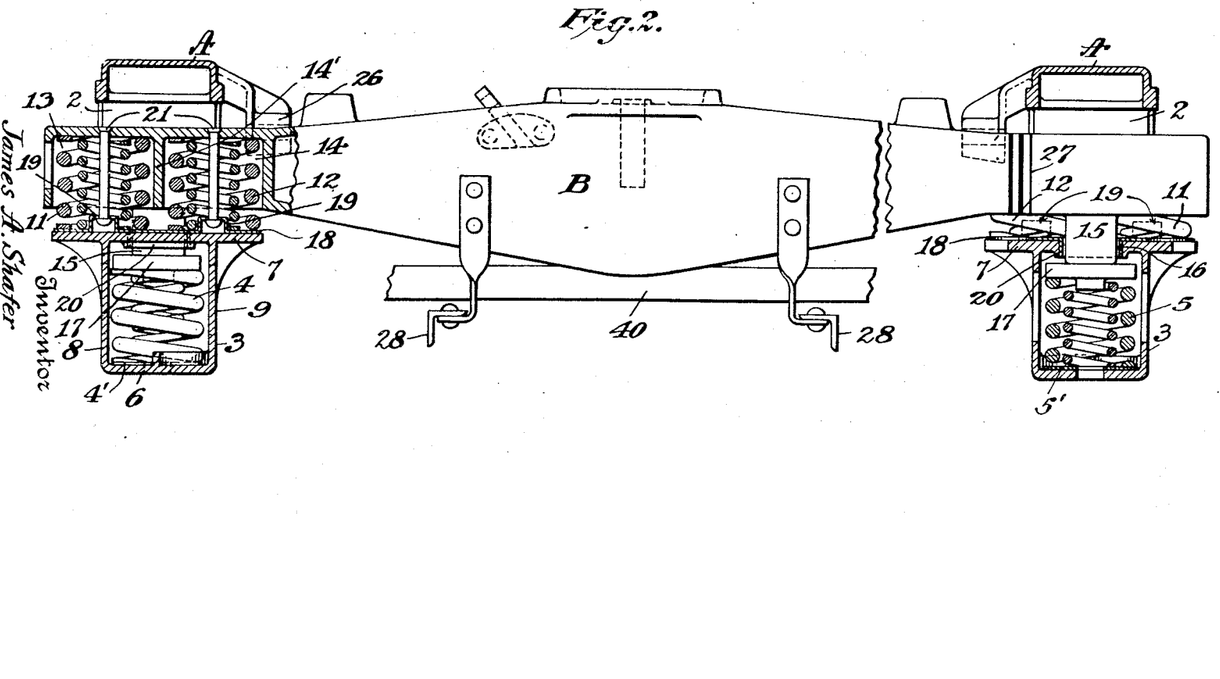
Fig. 2 is a view showing the bolster in side elevation and the car truck side frames in section, the side frame in Figure 1 being shown in Fig. 2 in section along the line II—II in Fig. 1 and the opposite side frame being shown in section along the line IIa—IIa indicated in Fig. 1.
Figure 3:
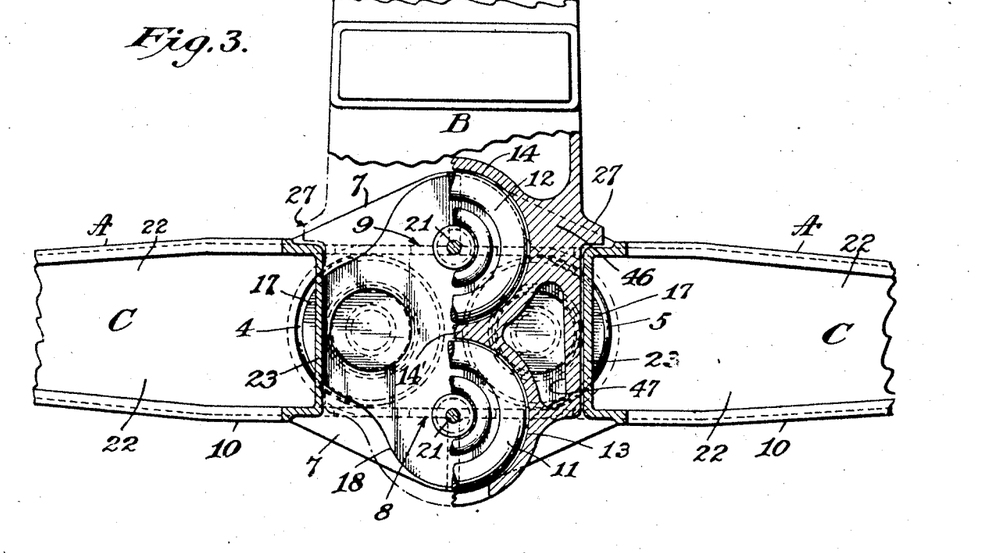
Fig. 3 is a view partly in plan and partly in horizontal section on line III—III of Fig. 1.

Referring particularly to Figs. 1, 2, and 3, the improved truck comprises two side frames A and a truck bolster B. Each of the side frames A is provided with a window 2 for the reception of the bolster. Below the window each side frame is formed with a portion designated generally by the numeral 3, in which springs 4, 5, are adapted to be seated and housed; said portion comprising a bottom shelf 6, a top flange or shelf 7, and side walls 8, 9. Said side walls are integral with said shelves 6 and 7 and are also integral with the side walls 10 of the tension members C. Said shelves 6, 7, and walls 8, 9, thus constitute a tension member integral with elements C. As shown, journal boxes D of conventional design are provided at the ends of the side frame for receiving the journals of the wheels of the truck; and the side frame shelf is substantially in alinement with the centers of said journals.

For supporting the bolster, each side frame is provided with springs 4, 5, in the tension portion 3, together with springs 11, 12 on the shelf 7. The springs 11, 12 on each side frame are received within pockets 13, 14, respectively, in the adjacent end portion of the bolster. Said springs 11, 12, are shown arranged in overlapping relation to the associated lower springs 4, 5. It may be noted that the springs 4, 5 are arranged longitudinally of the side frame while the springs 11, 12 are arranged longitudinally of the bolster or transversely of the side frame; the shelf 7 extending transversely beyond the lower shelf 6 for this purpose. The bolster rests upon the springs 4, 5, through the medium of projections 15, integral with said bolster and extending through holes 16 in the shelf 7, said projections resting upon caps 17 on the tops of said springs. As shown, each spring 4, 5, 11, and 12 may comprise both inner and outer coils, and the spring caps 17 serve to distribute the pressure from the bolster lugs 15 over both inner and outer coils of the respective springs 4, 5. Spring plates 4′, 5′ may be interposed between the bottoms of the springs 4, 5 and the shelf 6 as shown.

The springs 11 and 12 may bear upon the shelf 7 through a spring retaining plate 18. Projections 19 of said plate extend into the lower portions of said springs as shown and serve to center the latter. Flanges 20 extend downwardly from said plate into the holes 16 and take up the wear resulting from movement of the lugs 15 with respect to the side frame. Pins or bolts 21 may be employed for retaining the plate 18 and springs 11, 12, and for holding said elements in position on the bolster when the side frame is removed. The plate 18 may be conveniently pressed out of sheet steel and may be readily replaced when the flanges 20 have become worn out.

It may be pointed out that the side frame portion or tension member 3 is of box formation. Due to its side-walls 8, 9, said portion 3 is of decidedly greater strength than the open sided side frame portions previously employed between the members C. The springs 4, 5, may be conveniently removed from or inserted into the side frame portion 3 through the channels 22 in the tension members C, it being noted that the interior or channel portions of said members communicate with the interior of the member 3.

It will be furthermore seen that by positioning two of the bolster supporting springs above the tension portion 3, not only may the central web shown in said portion in my previously mentioned application be omitted, but the springs in said portion 3 may be moved closer together. This permits the columns 23 at the sides of the opening 2 to be placed closer together, thus reducing the bending moment in the tension member 3 and thereby further strengthening the side frame as a whole. Moreover, by placing two of the springs above said member there is no need for lateral off-sets at the bottom thereof, and the track clearance at this point is thus greatly increased.

The usual brake shoes 24 and hangers 25 are shown suspended from the brackets 26 on the side frame. The brackets 26 on each side frame are, of course, spaced apart sufficiently to permit the bolster, together with its inside stops 27, to move freely between said brackets. It is customary in car trucks that the distance from the center of each wheel to the center of the adjacent brake hanger bracket be fixed in accordance with the size of wheel, in order that the brake shoes will tend to fall away from the wheels by gravity upon release. In addition, in the standard A. R. A. (American Railway Association) car trucks, sufficient clearance between the spring plank and the brake beams must be provided to allow free operation of the brakes; while at the same time the spring plank must be sufficiently wide to permit the bolster to drop down between the upstanding flanges of said plank when the springs deflect under normal loads. It will thus be apparent that in standard car trucks employing a spring plank the requisite clearance between the spring plank and brake beam can be obtained only by a sufficient increase in wheel base; the width of the spring plank and the distance from wheel center to brake beam being fixed as above pointed out. In my improved truck the arrangement of springs, as above described, permits the side frame columns 23 to be positioned nearer together, and thus the brake hanger brackets 26 may also be placed closer together. A truck having a wheel base shortened an amount corresponding to the decrease in distance between said columns 23 is thereby provided. Decrease in length of wheel base is further permitted by the fact that my improved truck eliminates the customary spring plank and thus provides ample room for operation of the brake beam notwithstanding the shortened wheel base.

Each of the shelves 6 and 7 above described provides a spring bearing area serving to accommodate two spring units of the standard A. R. A. class G type. It may be noted that four spring units of the class G type provide greater spring capacity at ⅛ inch from solid height than do seven units of the standard A. R. A. class H type when driven solid. The standard A. R. A. trucks utilize five spring units of the class H type, and for increased spring capacity seven class H units have heretofore been employed. Through the employment of class G springs better riding qualities in addition to greater spring capacity are obtained as compared with the class H spring units customarily utilized.

As in my copending application above referred to, brackets 28 are attached to the bolster B for receiving the brake beams and preventing them from falling on the rails in case of broken hangers. At 40 there is indicated one of the brake beams. The latter are of standard type and are supported by and connected with the brake hangers in the same way as in the standard A. R. A. trucks.

To disassemble the truck the usual journal wedges and journal brasses are withdrawn and the brake hanger pins 41 are removed to disconnect the brake hangers 25 from the hanger brackets 26, the brake beams being thereupon received by the brackets 28. The bolster is then raised until the projections 15 clear the shelf 7 after which the side frames may be removed.

When the truck is assembled, and the brake hangers 25 connected to the hanger brackets, the bolster cannot be raised sufficiently to disengage the lugs 15 from the side frame; since the brackets 28 on the bolster will come into contact with the brake beams 40 before such disengagement can take place and further upward movement of the bolster is prevented inasmuch as the brake beams are connected to the side frames through the hangers and hanger brackets. Accidental disconnection of the bolster from the side frames is thus positively and effectively prevented.

Figure 4:
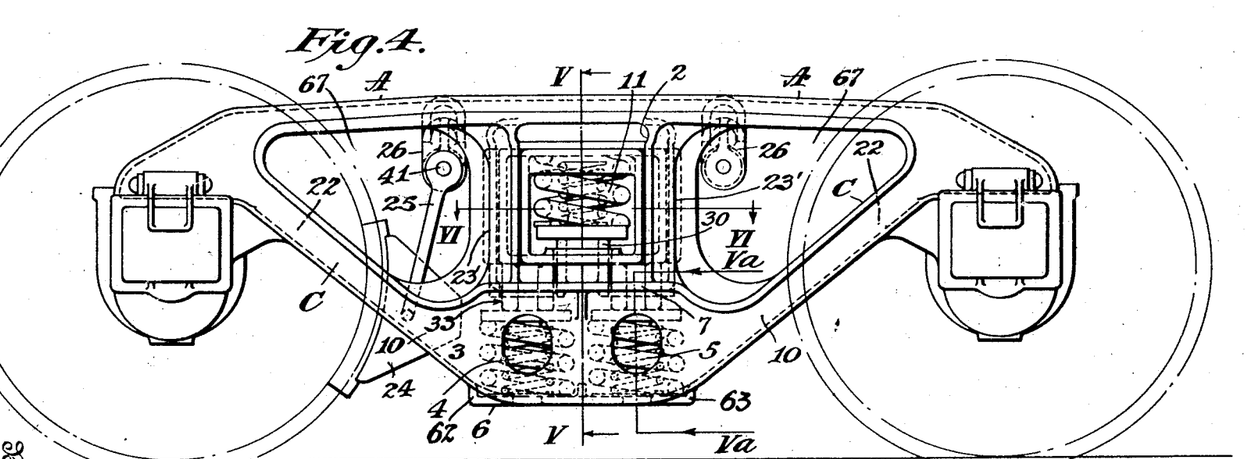
Fig. 4 is a view in side elevation of a modified form of car truck embodying my invention.
Figure 5:
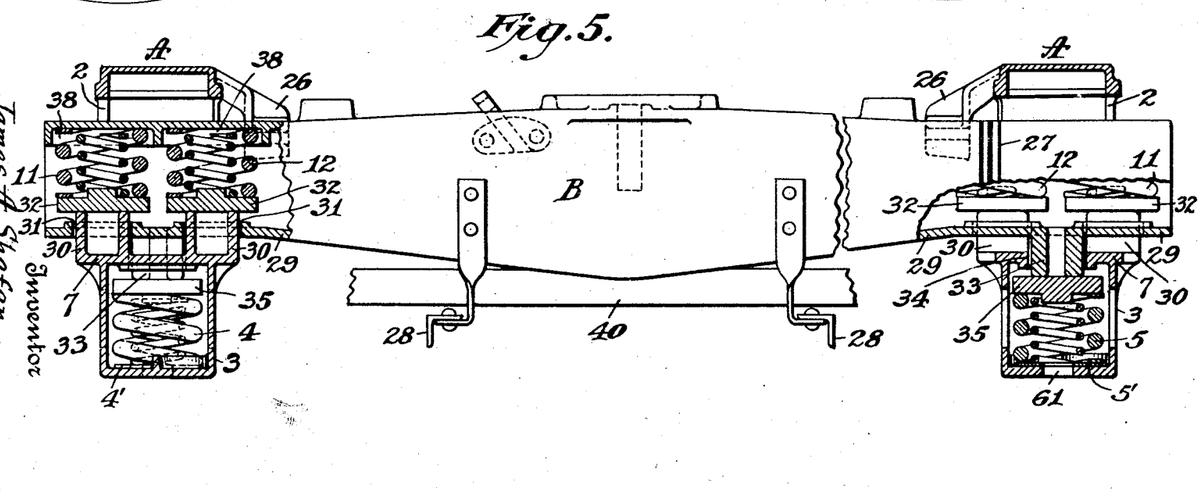
Fig. 5 is a view of said modified form of truck, showing the bolster in side elevation and the side frames in section; the side frame appearing in Fig. 4 being shown in Fig. 5 in section along the line V—V of Fig. 4 and the opposite side frame being shown in Fig. 5 in section along the line Va—Va of Fig. 4.
Figure 6:
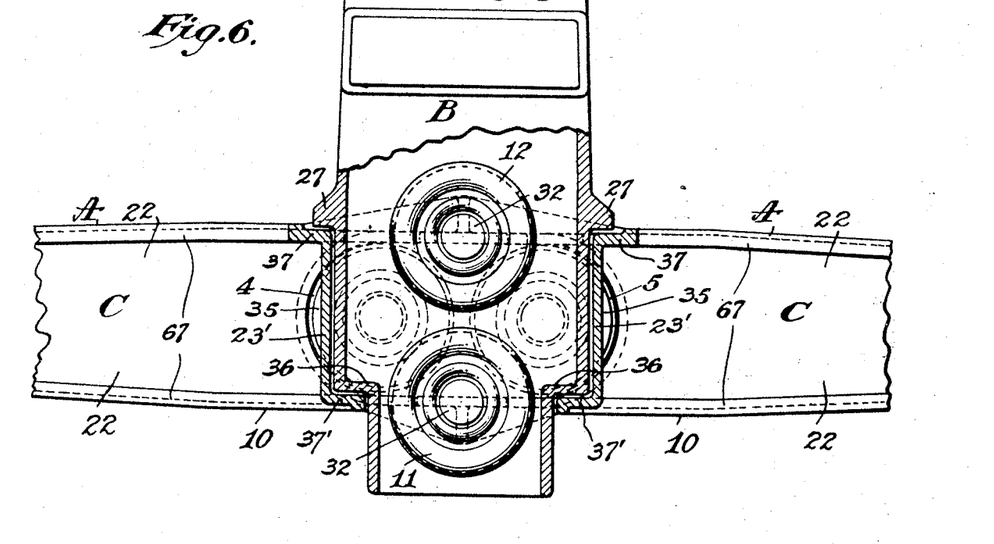
Fig. 6 is a view partly in plan and partly in horizontal section on line VI—VI of Fig. 4.

In the form of truck illustrated in Figs. 4, 5, and 6, the bottom 29 of the bolster B is continued out to the ends of the bolster instead of terminating at points adjacent the inner edges of the side frames. Lugs 30 integral with the shelf 7 of each side frame, extend through openings 31 in the bolster bottom 29. Said lugs 30 engage springs 11, 12 in the adjacent end portion of the bolster through spring caps 32. Lugs 33 on the bolster project through openings 34 in the adjacent shelf 7 and rest upon spring caps 35 on springs 4, 5 in the tension portion 3 of the associated side frame. The columns 23' at the sides of the bolster window 2 are shown Z-shaped in horizontal section (Fig. 6); and the bolster B in addition to its inside stops 27 cooperating with flanges 37 of said columns is shown provided with shoulders 36 for cooperation with the flanges 37' of said columns. Additional bearing area for lateral thrusts on the bolster is thereby provided. It will be evident that the inside stops 27 of the bolster may be omitted and end thrusts taken up simply by the shoulders 36 and flanges 37.

If desired, the columns 23 in Figs. 1, 2, and 3 may be made Z-shaped and may cooperate with shoulders on the bolster in the same way as in the construction shown in Figs. 4, 5, and 6.

In the truck shown in Figs. 1, 2, and 3, a wall 14' extends between pockets 13, 14 of the bolster. This wall, as well as the entire bottom surface of the bolster directly above the shelf 7 engages said shelf before the springs are driven solid, and thus said springs are effectively protected against oversolid loads. In the form shown in Figs. 4, 5, and 6, the springs are protected against oversolid loads by the engagement of the bottom 29 of the bolster B with the shelf 7. Pockets 38 may be provided in the top of the bolster B of Figs. 4, 5, and 6 for receiving the upper portions of the springs 11, 12, and centering the latter.

Figure 7:
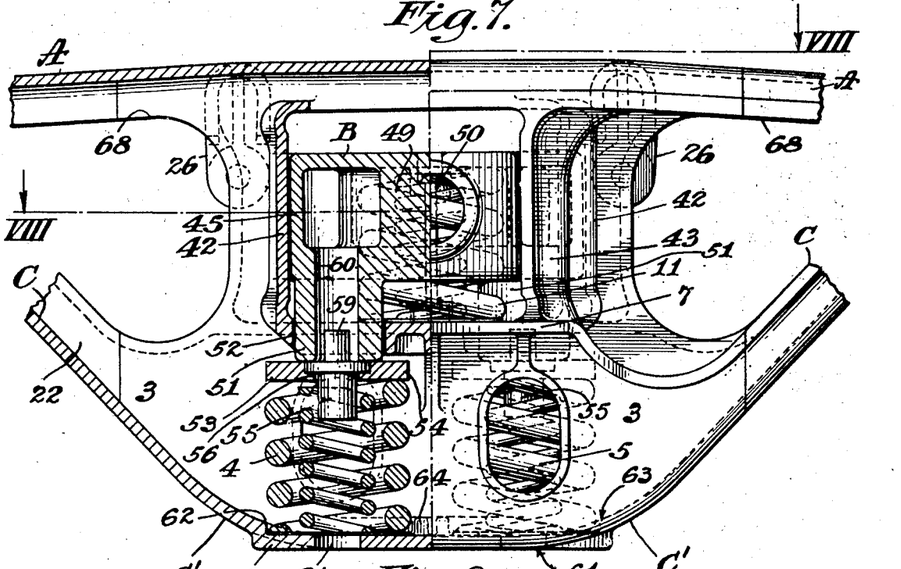
Fig. 7 is a view partly in side elevation and partly in vertical section, showing another modified form of my invention.
Figure 8:
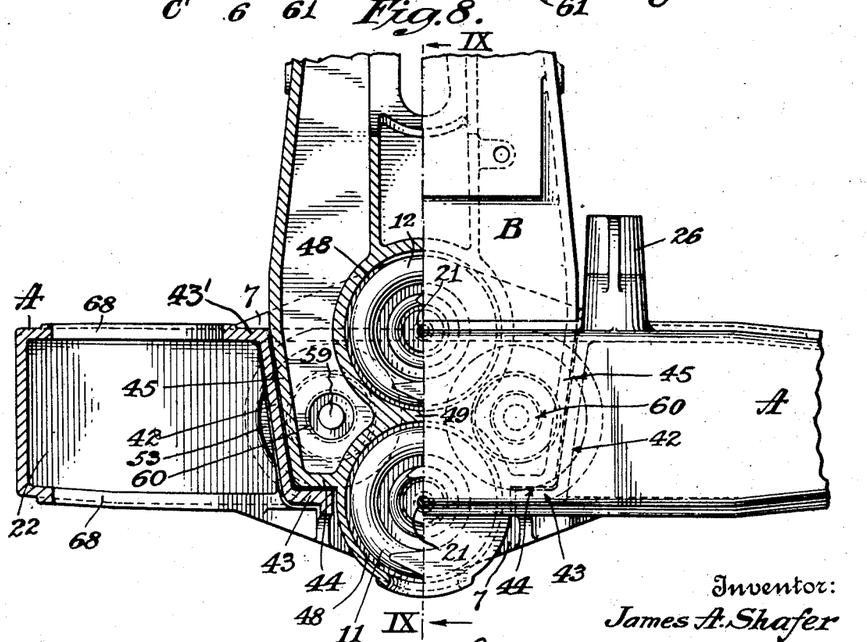
Fig. 8 is a view partly in plan and partly in horizontal section on line VIII—VIII of Fig. 7.
Figure 9:
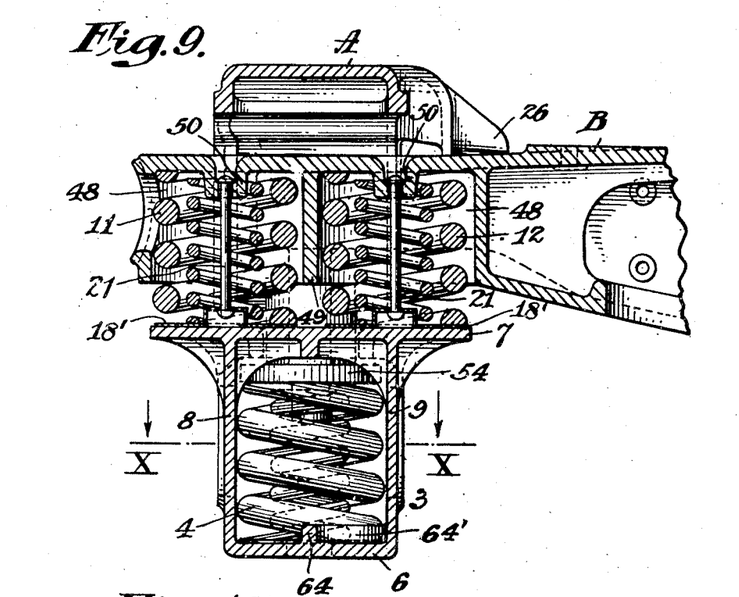
Fig. 9 is a vertical sectional view taken on line IV—IV of Fig. 8.

In the form of the invention shown in Figs. 7, 8, and 9, the upright columns 42 of the side frame are positioned at an angle to the center line of the frame as shown. Said columns are provided with flanges 43, 43' the flanges 43 being engageable by shoulders 44 on the bolster. The inclination of the side frame columns with respect to the center line of the frame provides increased space between said columns at the inside of the frame and enables the bolster to be widened in that region, as shown; the sides 45 of the end portion of the bolster converging from the inside of the frame to the outside thereof to correspond with the angle of the columns 42. Such widening of the bolster strengthens the latter. In the form of invention shown in Figs. 1, 2, and 3, the bolster includes solid portions 46 (Fig. 3) near the cored portions 47 of its ends for strengthening purposes; but in the widened form of bolster shown in Figs. 7, 8, and 9 the ends of the bolster may be cored out without the inclusion of said solid portions. Furthermore, in the casting of the bolster shown in Figs. 7, 8, and 9 only one core for each end of the bolster is required and the casting of said bolster is thus simplified.

The converging columns 42 and bolster sides 45 furthermore act to effect squaring of the truck, preserving the proper relationship between bolster and side frames. It may be noted that it at times happens in practice that one of the side frames of a car truck works forwardly of the other and thus subjects the journals and brasses to severe strains. This is particularly likely to take place in rounding curves. Due to the tapered or converging side frame columns 42 and bolster side portions 45 which I have provided, it will be seen that a thrust in either direction laterally of the truck will wedge the bolster into the frame so that if said frame is working forwardly it will be brought back to a position at right angles to the bolster and into proper relation to the other side frame. Since lateral thrusts are taking place in the rounding of curves it will be apparent that due to the converging or tapered elements aforesaid the side frames and bolster are maintained in their proper relation to each other at times when the side frames tend especially to become misaligned.

As in the bolster of Figs. 1, 2, and 3, each end of the bolster of Figs. 7, 8, and 9 is provided with pockets 48 for receiving bolster-supporting springs 11, 12, the latter being mounted on shelf 7 of the associated side frame. Said pockets are separated by an intervening wall 49. Bosses 50 extending downwardly from the top of the bolster into said pockets serve to center said springs. The springs may rest at their lower ends upon a retaining plate similar to the plate 18 of Figs. 1, 2, and 3, or upon separate retaining plates 18'. Bolts 21 retain the plates 18' and springs in position on the bolster when the side frame is removed, thus facilitating disassembly and assembly. The bolster is also supported at each end on the springs 4, 5, in the tension portion 3 of the associated side frame through lugs 51 which extend downwardly from said bolster through openings 52 in shelf 7. Said lugs rest upon said springs through the medium of spring caps 53.

To facilitate insertion and removal of the spring caps with respect to the springs 4, 5, the caps 53 are shown as each comprising a main member 54 and a separate boss member 55. Member 54 rests on top of the spring and is provided with a hole 56, and a countersunk portion 57. Member 55 projects through hole 56 and into the spring 4 or 5 and is provided with a flange 58 which fits into the countersunk portion 57 of member 54. A knob 59 projects from member 55 and fits into a hole 60 in the associated boss 51. To assemble the spring cap, the member 54 is set on top of spring 4 or 5 after the latter has been placed in the side frame tension portion 3. Member 55 is then passed through one of the holes 52 in shelf 7 and is engaged with member 54; the member 55 being passed through hole 56 and into the spring. The bolster is then inserted into the side frame window opening and the bosses 51 fitted over the knobs 59 of the spring cap members 55. The holes 52 are sufficiently large to permit the members 55 to be readily inserted and removed by hand.

In each of the forms of the invention herein disclosed the bottom shelves 6 of the side frame tension portions 3 are provided with drainage holes 61 to permit the egress of water and dirt from said portions. The shelf 6 in all forms of the invention may, as clearly shown in Fig. 10, be provided with spring centering means, comprising semicircular end walls 62, 63 and an intermediate wall 64 cooperating with the respective springs 4, 5. The wall 64 comprises a portion 64' cooperating with spring 4 and a portion 64" cooperating with spring 5. By this construction the springs 4, 5, are effectively centered. At the same time, by extending the wall portion 64 around only a portion of spring 4, as shown, the shelf portion 65 is maintained in communication with the drainage hole 61 under said spring and is not cut off from said hole, as would be the case if wall 64' were extended around spring 4 from wall 8 to wall 9. Likewise, wall portion 64" extends around only a portion of spring 5 as shown so that portion 66 of shelf 6 is not cut off from communication with the drainage hole under said spring, as would be the case if said wall 64" extended around spring 5 from wall 9 to wall 8.

Figure 10:
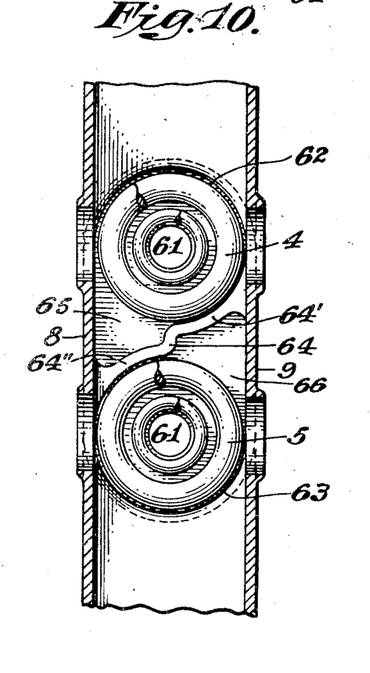
Fig. 10 is a horizontal sectional view taken on line X—X of Fig. 9.
Figure 11:
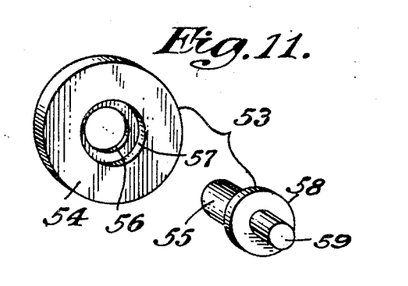
Fig. 11 is a view of certain details.

The flanges or end walls 62, 63 merge with the tension members C as shown. It will be seen that by providing the spring receiving shelf 6 having the end flanges aforesaid a substantial saving in side frame weight is effected, since the curves C' at the lower portion of the side frame tension members can be located nearer the side frame center line. In other words, if the flanges 62, 63 were omitted, and the lower portions of the tension members C were formed to receive and seat the springs the curved portions C' would be positioned further from the center line of the side frame and the weight would be considerably increased.

It will be seen that due to the Z-shaped columns 23 in the form of the invention shown in Figs. 4, 5, and 6, the triangular openings 67 in the side frame are smaller at the inside of the frame than at the outside thereof, as will be readily apparent from Figs. 4 and 6. The same is true of the triangular openings 68 in the form of the invention shown in Figs. 7, 8, and 9, as will be particularly evident from Figs. 7 and 8.

Matter disclosed but not claimed herein is claimed in my application Serial No. 347,262, hereinbefore referred to.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

What I claim is:

1. In a car truck, a side frame, a bolster, a bolster supporting spring on said side frame, and another bolster supporting spring mounted on another portion of said side frame entirely above the first mentioned spring, and means protecting said springs against oversolid blows.

2. In a car truck, a side frame having columns, a bolster, interengaging means on said bolster and said side frame for maintaining said bolster and said side frame in a given relation to each other, spring means on said side frame extending beneath said columns and cooperating with a portion of said interengaging means for supporting said bolster, and other spring means on said side frame above the first-mentioned spring means and between said columns and cooperating with said bolster to support the latter.

3. In a car truck, a side frame, a bolster having a hollow end portion, and spring means within said portion and cooperating with said side frame for supporting said bolster, the depth of said hollow end portion being such that the latter is engageable with the side frame before said spring means is driven solid.

4. In a car truck, a side frame having a bolster receiving window and a tension portion therebelow, a bolster in said window and having a hollow end portion, spring means within said hollow end portion and cooperating with said side frame for supporting said bolster, interengaging means between said bolster and said side frame for maintaining said bolster and said side frame in a given relation to one another, and spring means in said tension portion of said side frame cooperating with a portion of said interengaging means for supporting said bolster.

5. In a car truck, a side frame, a bolster having a hollow end portion, spring means within said portion and cooperating with said side frame for supporting said bolster, interengaging means between said bolster and said side frame for limiting movement of the bolster transversely of the side frame, and spring means positioned on said side frame on a different level from the first mentioned spring means and cooperating with a portion of said interengaging means for supporting said bolster.

6. In a car truck, a bolster, a side frame having an opening for receiving said bolster, spring seating means at the bottom of said opening, spring means on said seating means and cooperating with one portion of said bolster for supporting the latter, a tension portion of said side frame beneath said spring seating means and having side walls, and spring means substantially entirely within said tension portion and cooperating with another portion of said bolster at a lower level than the first-named portion for supporting the bolster.

7. In a car truck, a bolster, a side frame comprising a tension portion having a top flange, spring means in said tension portion, means projecting through said top flange whereby the bolster is supported on said spring means, and spring means on said top flange for supporting the bolster said bolster having downwardly projecting portions adjacent said last-named spring means for limiting downward movement of the bolster.

8. In a car truck, a bolster, a side frame including a compression member, a tension portion comprising top and bottom elements and opposite side walls connecting said elements, bolster guide columns extending upwardly from the top element of said tension portion and forming with said compression member a bolster window opening, inclined tension members extending from opposite sides of said tension portion to said compression member and defining with said compression member and said columns triangular openings on opposite sides of said columns, spring means entirely within said tension portion for supporting said bolster, said spring means being insertable beneath said bolster guide columns and into said tension portion through one of said triangular openings, and other spring means above said portion for supporting said bolster independently of the first mentioned spring means.

9. In a car truck, a bolster, a side frame comprising a tension portion having a top wall, spring means in said tension portion, means projecting through said top wall whereby the bolster is interlocked with the side frame and is supported on said spring means, and spring means on said top wall for supporting the bolster.

10. In a car truck, a bolster, a side frame having an opening for receiving said bolster, and columns on said side frame at the sides of said opening, said columns being Z-shaped in cross-section and cooperating with said bolster, the webs of said columns diverging transversely of the side frame.

11. In a car truck, a bolster, a side frame having an opening for receiving said bolster, spring seating means at the bottom of said opening, springs on said means and cooperating with the bolster to support the latter, and means on said bolster for cooperating with said seating means for preventing the bolster from driving the springs solid.

12. In a car truck, a bolster, a side frame having an opening for receiving said bolster, spring seating means at the bottom of said opening, a set of springs on said means and cooperating with said bolster to support the latter, a tension portion of said side frame beneath said seating means, a set of springs in said tension portion and cooperating with said bolster for supporting the latter, and means for preventing said bolster from driving all of the springs solid.

13. In a car truck, a bolster, a side frame, means comprising springs mounted on different levels on said side frame and acting in parallel for supporting said bolster, and means for preventing said bolster from driving said springs solid, certain of said springs being entirely above others thereof.

14. In a car truck, a bolster, a side frame having a spring-receiving portion, springs in said portion, a shelf forming the top of said portion, projections on the bolster extending through openings in said shelf and resting upon said springs, springs on said shelf for supporting the bolster, and a member having bosses for centering the last named springs and provided with flanges fitting said openings and surrounding said projections.

15. In a car truck, a side frame having a bolster window opening and columns at the sides of said opening and adapted for sliding engagement with the bolster, said columns converging from the inner side of the frame to the outer side thereof and having projections extending therefrom for receiving end thrusts from the bolster.

16. In a car truck, a side frame having a bolster window opening and columns at the sides of said opening converging from the inner side of the frame to the outer side thereof, and a bolster having a converging end portion cooperating with said columns.

17. In a car truck, a side frame having a bolster window opening and columns at the sides of said opening, converging from the inner side of the frame to the outer side thereof, each of said columns having inner and outer flanges extending respectively in opposite directions, and a bolster having shoulders cooperating with certain of said flanges.

18. In a car truck, a side frame, springs mounted thereon, a shelf above said springs, a bolster having projections extending through openings in said shelf, spring caps interposed between said projections and said springs, each of said caps comprising an element seated on top of the associated spring, and a member removably seated on said element and extending into said spring for centering the latter, said member having an extension receivable in an opening in the associated projection of the bolster.

19. In a car truck, a side frame, springs mounted thereon, a shelf above said springs, a bolster having projections extending through openings in said shelf, spring caps interposed between said projections and said springs, each of said caps comprising an element seated on top of the associated spring, and a member removably seated on said element and extending into said spring for centering the latter, said member being engageable by the associated projection of the bolster.

20. In a car truck, a side frame having a tension portion comprising side walls and a bottom shelf, springs mounted on said shelf, said shelf having drainage openings beneath said springs, end walls on said shelf cooperating with said springs and an intermediate wall extending from one of said side walls to the other, one portion of said intermediate wall cooperating with one of said springs and another portion of said intermediate wall with another of said springs.

21. In a car truck, a side frame having a tension portion comprising side walls and a bottom shelf, springs mounted on said shelf, said shelf having drainage openings beneath said springs, end walls on said shelf cooperating with said springs for centering the latter, means extending from one of said side walls toward the other but terminating in an intermediate portion of the shell for aiding in centering one of said springs, and means extending from the other of said side walls and terminating in an intermediate portion of said shelf for aiding in centering the other of said springs.

22. A railway truck side frame having a tension and a compression member both of U-section and column members of Z-section having webs inclined transversely of the frame.

23. In a car truck, a bolster, a side frame having a window opening into which an end of said bolster projects, the bolster having a cavity in said end forming a spring pocket, spring means in said cavity, said side frame having a portion extending into said window opening and engaging said spring means, and other spring means seated on the side frame beneath the window opening and engaging the bolster.

24. In a car truck, a bolster having an opening in one end thereof, a side frame comprising a tension portion having a projection extending upwardly therefrom into said opening and interlocking with the bolster, and spring means interposed between said projection and a portion of said bolster for supporting the latter.

25. In a car truck, a bolster having an opening in one end thereof, a side frame comprising a tension portion having a top flange, a projection extending upwardly from said tension portion into said opening, means on said bolster projecting through said top flange into the interior of said tension portion, and spring means in said tension portion engaging said projecting means for supporting said bolster.

26. In a car truck, a bolster having an opening in one end thereof, a side frame comprising a tension portion having a top flange, a projection extending upwardly from said tension portion into said opening, means on said bolster projecting through said top flange into the interior of said tension portion, spring means in said tension portion engaging said projecting means for supporting said bolster, and other spring means interposed between the first mentioned projection and a portion of the bolster for supporting the latter.

27. In a car truck, a bolster, a side frame, interlocking means therebetween comprising projections on one of said members entering openings in the other, a set of springs on said side frame and cooperating with said projections for supporting the bolster, and a set of springs on said side frame on a different level from the first mentioned springs and cooperating with the bolster for supporting the latter, the central longitudinal vertical plane of one of the sets being substantially at right angles to that of the other of said sets.

28. In a car truck, a side frame having a bolster receiving opening, a bolster extending into said opening, said side frame comprising a tension portion beneath said opening and columns at the sides of said opening, bolster supporting spring means having portions underlying said columns, and other bolster supporting spring means between said columns, the distance between said columns being sufficient for only one spring of the standard A. R. A. class G type in a direction longitudinally of the side frame.

29. In a car truck, a side frame member, a bolster member, lugs on one of said members engaging openings in the other for interlocking said members together, and means comprising a projection on the bolster and a brake element on said side frame for preventing relative movement of said side frame and bolster sufficiently to disengage said lugs from said openings.

30. In a car truck, a side frame member, a bolster member, lugs on one of said members engaging openings in the other for interlocking said members together, brake beams suspended from said side frame, and brake beam safety brackets attached to said bolster, said brackets being so positioned as to engage said beams upon relative vertical movement of said bolster and side frame prior to disengagement of said lugs from said openings.

31. In a car truck, a side frame, a bolster, interlocking means between said bolster and said side frame, a brake beam suspended from said side frame, and means on said bolster adapted to cooperate with said brake beam for preventing relative movement of said bolster and side frame to such extent as to disable said interlocking means.

32. In a car truck, a bolster, a side frame, comprising a shelf portion and an opening thereabove for receiving an end of said bolster, springs between said bolster and said shelf portion, said springs cooperating with the bolster for supporting the same, projections on said bolster passing through openings in said shelf, a vertical plane through said projections passing between the centers of said springs and being substantially at right angles to the central longitudinal vertical plane of said springs, and spring means positioned on said side frame below said shelf and cooperating with said projections for supporting the bolster.

33. In a car truck, a bolster, a side frame comprising a shelf portion and an opening thereabove for receiving an end of said bolster, said bolster end having spring receiving pockets arranged longitudinally of the bolster, springs on said shelf portion received in said pockets, projections depending from said bolster and extending through openings in said shelf portion, a vertical plane through said projections passing between the centers of said springs and being substantially at right angles to the central longitudinal vertical plane of said springs, and spring means positioned on said side frame below said shelf and cooperating with said projections for supporting the bolster.

34. In a car truck, a side frame, a bolster, means comprising a projection on the bolster engaging the side frame for limiting movement of the bolster transversely of the side frame in either of opposite directions, and bolster supporting springs mounted on different levels on said side frame, one of said springs supporting the bolster through said projection.

35. In a car truck, a side frame, a bolster, means comprising a projection on the bolster engaging the side frame for limiting movement of the bolster transversely of the side frame, a bolster supporting spring on said side frame, and another bolster supporting spring mounted on another portion of said side frame entirely above the first mentioned spring, one of said springs supporting the bolster through the medium of said projection.

36. In a car truck, a side frame having a tension portion, a bolster, a projection on said bolster for engaging said side frame, spring means in said tension portion of the side frame and reacting vertically thereagainst, said spring means cooperating with said projection for supporting said bolster, and springs on said side frame above said spring means and cooperating with said bolster to support the latter.

37. In a car truck, a bolster, a side frame having a plurality of horizontal spring supporting portions one above the other, spring means on each of said portions for supporting said bolster, said bolster having a projection extending through one of said spring supporting portions for engaging the spring means on the other of said portions and for guiding said bolster relative to said side frame.

38. A truck bolster comprising a central portion and end portions each of said end portions comprising a top wall and vertical side walls, additional vertical walls extending downwardly from said top wall spaced from and extending beyond said side walls, said additional vertical walls providing a pocket adapted to receive a spring, other vertical walls joining said side walls and said additional walls, a bottom wall connecting said side walls to said additional vertical walls to form a box-like section, and a projection extending downwardly from said bottom wall.

39. A truck bolster comprising a center portion and end portions, said end portions being partly of box section and partly of downwardly open hollow construction, said hollow portion forming a spring receiving recess, and a projection extending downwardly below said box portion.

40. In a car truck including a bolster and a pair of side frames, each having a shelf, spring means on said shelf for supporting the bolster, and other spring means below said shelf and arranged longitudinally of the side frame, said bolster having means integral therewith and depending therefrom at each end thereof for engaging said side frames and tying the latter together, and said other spring means cooperating with the means depending from the associated end of the bolster for supporting said bolster.

41. In a car truck including a bolster and a pair of side frames, each having a shelf, spring means on said shelf for supporting the bolster, and other spring means below said shelf, said other spring means being located entirely within the confines of the side frame and arranged longitudinally of the latter, said bolster having means integral therewith and depending from opposite ends thereof and engaging the side frames for tying the latter together, and the other spring means cooperating with the means depending from the associated end of the bolster for supporting the bolster.

42. In a car truck, a bolster, a pair of side frames, each having a shelf portion, said bolster having means projecting from opposite ends thereof and integral therewith and extending through openings in the respective side frame shelves for tying said side frames together, spring means above each shelf supporting said bolster, other spring means below said shelf and arranged longitudinally of the side frame, said other spring means cooperating with the associated bolster projecting means for supporting said bolster, and means on said other spring means cooperating with said bolster projecting means for limiting movement of said other spring means with respect to said bolster.

43. In a car truck, including a bolster, a side frame having a shelf and a tension portion extending below said shelf, spring means on said shelf for supporting the bolster, other spring means in said tension portion adapted to be compressed in the direction of and upon downward movement of said bolster for supporting the latter, said other spring means being located entirely within the confines of said tension portion, and means on said bolster projecting through said shelf for engagement with said other spring means.

44. In a car truck, a bolster, a side frame, comprising a shelf portion and an opening thereabove for receiving an end of said bolster, springs between said bolster and said shelf portion, said springs cooperating with the bolster for supporting the same, projecting means on said bolster passing through an opening in said shelf, a vertical plane through said projecting means passing between the centers of said springs and being substantially at right angles to the central longitudinal vertical plane of said springs, and spring means positioned on said side frame below said shelf and cooperating with said projecting means for supporting the bolster.

45. In a car truck, a side frame having a bolster receiving opening, a bolster projecting into said opening, a shelf on said side frame below said bolster, means comprising a projection on said bolster passing through an opening in said shelf for limiting movement of the bolster transversely of the side frame in either of opposite directions, spring means on said side frame below said shelf and cooperating with said projection for supporting said bolster, and spring means on said side frame above said shelf for supporting said bolster.

46. In a car truck, a side frame member having a bolster receiving opening, a bolster member projecting into said opening, means comprising a projection on one of said members extending into an aperture in the other of said members for limiting movement of the bolster transversely of the side frame in either of opposite directions, and a plurality of bolster supporting spring means mounted on different levels on said side frame, one of said spring means engaging said projection.

47. In a car truck, a side frame having a bolster receiving opening, a bolster projecting into said opening, a shelf on said side frame below said bolster, said side frame having a tension portion below said shelf and comprising bottom and side walls, means comprising a projection on said bolster passing through said shelf for limiting movement of the bolster transversely of the side frame in either of opposite directions, spring means entirely within said tension portion and cooperating with said projection for supporting said bolster, and spring means on said shelf cooperating with said bolster for supporting the latter.

48. A truck bolster comprising a central portion and end portions, each of said end portions comprising a top wall and vertical side walls, additional vertical walls extending downwardly from said top wall spaced from and extending beyond said side walls, said additional vertical walls providing a pocket adapted to receive a spring, and other vertical walls joining said side walls and said additional walls.

JAMES A. SHAFER.